United States Patent
Pei et al.

(10) Patent No.: US 11,747,160 B2
(45) Date of Patent: Sep. 5, 2023

(54) ROUTE PROCESSING METHOD AND APPARATUS

(71) Applicant: BEIJING BAIDU NETCOM SCIENCE TECHNOLOGY CO., LTD., Beijing (CN)

(72) Inventors: Xinxin Pei, Beijing (CN); Wei Yu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/562,432

(22) Filed: Dec. 27, 2021

(65) Prior Publication Data
US 2022/0120582 A1  Apr. 21, 2022

(30) Foreign Application Priority Data

Apr. 29, 2021 (CN) .......................... 202110477326.3

(51) Int. Cl.
*G01C 21/30* (2006.01)
*G01C 21/36* (2006.01)
*G01C 21/34* (2006.01)

(52) U.S. Cl.
CPC ......... *G01C 21/3667* (2013.01); *G01C 21/30* (2013.01); *G01C 21/3415* (2013.01)

(58) Field of Classification Search
CPC ................................................ G01C 21/3667
See application file for complete search history.

(56) References Cited

U.S. PATENT DOCUMENTS 11,073,831 B2 * 7/2021 Jiang .................... G05D 1/0088
11,414,099 B2 * 8/2022 Taylor .................... B60W 30/12
(Continued)

FOREIGN PATENT DOCUMENTS

| CN | 105043403 B | 12/2017 |
| CN | 109885635 A | 6/2019 |

(Continued)

OTHER PUBLICATIONS

Extended European Search Report dated Jun. 17, 2022 for Application Serial No. EP21217572.3 (8 pages).

*Primary Examiner* — Shelley Chen
(74) *Attorney, Agent, or Firm* — Tucker Ellis LLP (57) ABSTRACT

The present disclosure provides a route processing method and apparatus. The specific implementation includes: acquiring a vehicle driving route according to a standard definition map, where the vehicle driving route comprises multiple standard definition map road sections of the standard definition map; determining at least one first road section from the multiple standard definition map road sections according to a road section mapping relationship between the standard definition map and a high definition map, where each first road section has a unique corresponding target road section in the high definition map; determining the target road section corresponding to each first road section in the high definition map according to the road section mapping relationship; and determining a target driving route corresponding to the vehicle driving route in the high definition map according to the target road section corresponding to each first road section and the high definition map.

14 Claims, 6 Drawing Sheets

(56) References Cited

U.S. PATENT DOCUMENTS

| | | | | |
|---|---|---|---|---|
| 2004/0056861 A1* | 3/2004 | Huber | | G06T 17/05 |
| | | | | 345/428 |
| 2016/0138924 A1* | 5/2016 | An | | G01C 21/34 |
| | | | | 701/25 |
| 2017/0199267 A1* | 7/2017 | Bitra | | H04W 64/00 |
| 2019/0137285 A1* | 5/2019 | Bailey | | G11C 5/147 |
| 2019/0145785 A1* | 5/2019 | Pfeifle | | G01C 21/38 |
| | | | | 701/533 |
| 2020/0125102 A1* | 4/2020 | Jiang | | G05D 1/021 |
| 2020/0348145 A1* | 11/2020 | Paranjpe | | G01C 21/367 |
| 2022/0063652 A1* | 3/2022 | Taylor | | B60W 30/17 |

FOREIGN PATENT DOCUMENTS

| | | | | |
|---|---|---|---|---|
| CN | 110160552 A | | 8/2019 | |
| CN | 112146671 A | | 12/2020 | |
| CN | 112539754 A | | 3/2021 | |
| CN | 112543723 A | | 3/2021 | |
| DE | 102005012849 A1 * | | 9/2006 | ........... G09B 29/005 |
| JP | 3882554 B2 * | | 2/2007 | ......... G01C 21/3484 |
| JP | 2017201234 A | * | 11/2017 | |
| JP | 2017203733 A | * | 11/2017 | |
| WO | WO-2014024604 A1 * | | 2/2014 | .............. B60L 58/12 |
| WO | WO-2017211387 A1 * | | 12/2017 | ............. G01C 21/32 |

\* cited by examiner

| SD road section identification | SD starting position offset (%) | SD ending position offset (%) | HD road section identification | HD starting position offset (%) | HD ending position offset (%) |
|---|---|---|---|---|---|
| S100 | 0 | 100 | H100 | 0 | 100 |
| S101 | 30 | 100 | H102 | 0 | 100 |
| S300 | 0 | 100 | H200 | 20 | 100 |
| S301 | 0 | 100 | H300 | 30 | 100 |

| SD road section identification | SD starting position offset (%) | SD ending position offset (%) | HD road section identification | HD starting position offset (%) | HD ending position offset (%) |
|---|---|---|---|---|---|
| S100 | 0 | 100 | H100 | 0 | 100 |
| S101 | 30 | 100 | H102 | 0 | 100 |
| S300 | 0 | 100 | H200 | 20 | 100 |
| S301 | 0 | 100 | H300 | 30 | 100 |
| S200 | 0 | 100 | H200 | 0 | 20 |
| S200 | 0 | 50 | H101 | 0 | 100 |
| S200 | 50 | 100 | H300 | 0 | 30 |

ROUTE PROCESSING METHOD AND APPARATUS

CROSS-REFERENCE TO RELATED APPLICATION

This application claims priority to Chinese Patent Application No. 202110477326.3, filed on Apr. 29, 2021, which is hereby incorporated by reference in its entirety.

TECHNICAL FIELD

The present disclosure relates to the field of automatic driving in computer technology, and in particular to a route processing method and apparatus.

BACKGROUND

With the continuous development of the technology related to automatic driving, the current high definition maps play an increasingly important role in the automatic driving process of vehicle.

At present, when implementing automatic driving based on high definition maps in related technology, route planning is usually based on standard definition maps. Then, according to the mapping relationship between the standard definition map and the high definition map, a matched route of a planned route is determined in the high definition map. However, certain errors will exist between the standard definition map and the high definition map, resulting in that the road sections of the two maps are not necessarily completely corresponding. For road sections with unclear correspondence, usually, one corresponding road section is chosen randomly in multiple corresponding road sections for autonomous driving.

However, the randomly selected road section may not conform to the vehicle driving road section users needed. Therefore, when implementing automatic driving based on the high definition maps, there is a problem that the accuracy of the matched route is not high.

SUMMARY

The present disclosure provides a route processing method and apparatus.

According to the first aspect of the present disclosure, provided is a route processing method, including:

acquiring a vehicle driving route according to a standard definition map, where the vehicle driving route comprises multiple standard definition map road sections of the standard definition map;

determining at least one first road section from the multiple standard definition map road sections according to a road section mapping relationship between the standard definition map and a high definition map, where each first road section has a unique corresponding target road section in the high definition map;

determining the target road section corresponding to each first road section in the high definition map according to the road section mapping relationship;

determining a target driving route corresponding to the vehicle driving route in the high definition map according to the target road section corresponding to each first road section and the high definition map, where the target driving route comprises each target road section and a filling road section, and the filling road section is a road section other than the target road section in the target driving route.

According to the second aspect of the present disclosure, provided is a route processing apparatus, including:

an acquiring module, configured to acquire a vehicle driving route according to a standard definition map, where the vehicle driving route comprises multiple standard definition map road sections of the standard definition map;

a first determining module, configured to determine at least one first road section from the multiple standard definition map road sections according to a road section mapping relationship between the standard definition map and a high definition map, where each first road section has a unique corresponding target road section in the high definition map;

a second determining module, configured to determine the target road section corresponding to each first road section in the high definition map according to the road section mapping relationship;

a third determining module, configured to determine a target driving route corresponding to the vehicle driving route in the high definition map according to the target road section corresponding to each first road section and the high definition map, where the target driving route comprises each target road section and a filling road section, and the filling road section is a road section other than the target road section in the target driving route.

According to the third aspect of the present disclosure, provided is an electrical device, including:

at least one processor; and a memory connected in communication with the at least one processor; where, the memory stores instructions executable by the at least one processor, and the instructions are executed by the at least one processor, so that the at least one processor can execute the methods according to the first aspect.

According to the fourth aspect of the present disclosure, provided is a non-transitory computer-readable storage medium storing computer instructions, where the computer instructions are used to enable a computer to execute the methods according to the first aspect.

According to the fifth aspect of the present disclosure, provided is a computer program product, the computer program product includes a computer program which is stored in a computer-readable storage medium, at least one processor of the electrical device can read the computer program stored from the computer-readable storage medium, the computer program is executed by the at least one processor to enable the electrical device to execute the methods according to the first aspect.

The technology according to the present disclosure solves the problem of low accuracy of the matched route in high definition maps.

It should be understood that the content described in this section is not intended to identify the key or important features of the embodiments of the present disclosure, nor is it intended to limit the scope of the present disclosure. Other features of the present disclosure will become easy to understand through the following description.

BRIEF DESCRIPTION OF DRAWINGS

The drawings are used to better understand the solutions and do not constitute a limitation to the present disclosure. Among them.

DESCRIPTION OF EMBODIMENTS

Exemplary embodiments of the present application will be explained hereunder with reference to the accompanying drawings, which include various details of the embodiments of the present disclosure to facilitate understanding, and should be regarded as merely exemplary. Therefore, those of ordinary skill in the art should recognize that various changes and modifications can be made to the embodiments described herein without departing from the scope and spirit of the present disclosure. Likewise, for clarity and conciseness, descriptions of well-known functions and structures are omitted in the following description.

In order to better understand the technical solutions of the present disclosure, first of all, the relevant technologies involved in the present disclosure will be further introduced in detail.

With the continuous development of the driving field, the current automatic driving technology has also made great progress. The automatic driving technology usually needs to be implemented based on the standard definition map (SD map) and the high definition map (HD map). Firstly, the high definition map will be briefly described as follows.

The high definition map refers to a high definition, refined-defined map. The high definition map will allow the automatic driving to have a wider field of view to see more clearly and in a more timely manner, which plays a role in constructing the overall memory and cognition of space similar to the human brain and has the functions of positioning, decision-making assistance, and navigation. At the same time, the high definition map can provide complete lane information, based on the "over-the-horizon perception" brought by the high definition map, and can be compared with the information recognized by the sensor, so as to achieve high definition positioning, ensure safety, and provide reference information on the feasibility of lane changing, which becomes an indispensable safety redundancy scheme.

Also, there is much point of interest (POI) information in the standard definition map, which is a necessary data component for route planning.

Figure 1:
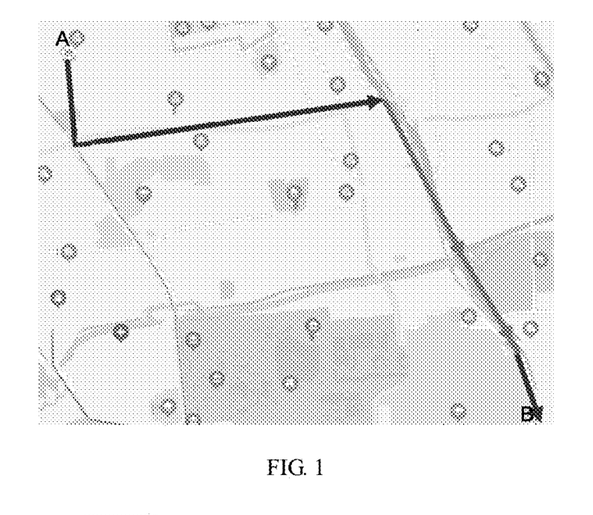
FIG. 1 is a schematic diagram of a planned route in a standard definition map provided by an embodiment of the present disclosure.

Generally, when realizing automatic driving of a vehicle, a route planning between the starting point and the ending point according to a standard definition map is usually performed firstly. For example, the route planning in the standard definition map can be understood with reference to FIG. 1. FIG. 1 is a schematic diagram of a planned route in a standard definition map provided by an embodiment of the present disclosure.

Referring to FIG. 1, assuming that the current starting point is point A shown in FIG. 1, and the ending point is point B shown in FIG. 1, then the vehicle side can obtain a planned route between starting point A and ending point B based on the standard definition map, for example, it can arbitrarily be the route shown by the arrow in FIG. 1.

After obtaining the route planned based on the standard definition map, a matched route of the current route in the high definition map can be determined through the mapping relationship between the standard definition map and the high definition map stored in the cloud side, and then autonomous driving of vehicle is realized based on the matched route in the high definition map.

Figure 2:
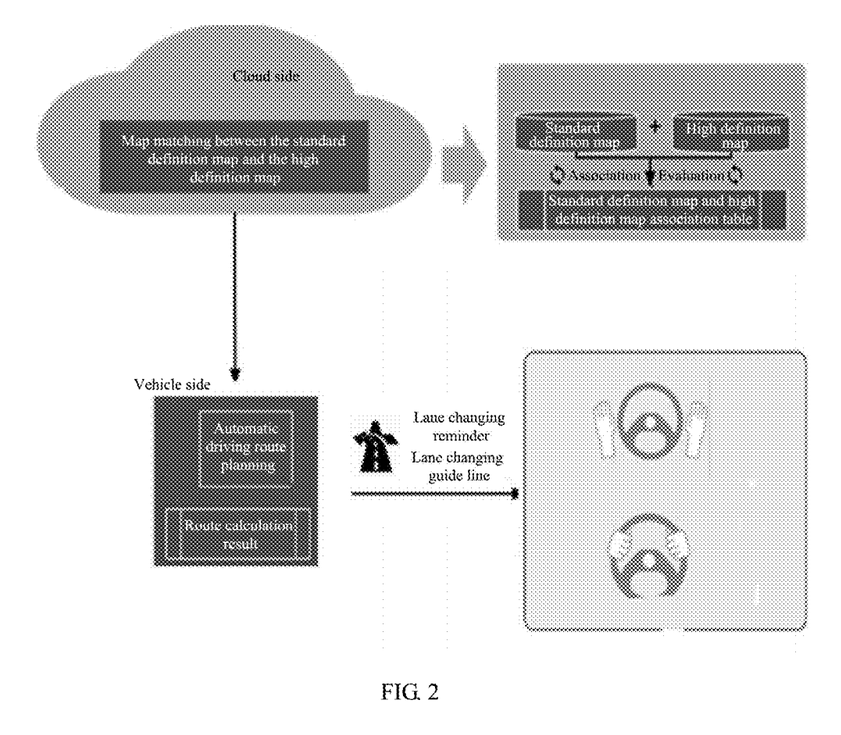
FIG. 2 is a schematic diagram of a system of a route processing method provided by an embodiment of the present disclosure.

For example, the process can be understood in combination with FIG. 2, FIG. 2 is a schematic diagram of a system of a route processing method provided by an embodiment of the present disclosure.

Referring to FIG. 2, because the high definition map and standard definition map are stored in the cloud side simultaneously, the road network of the two maps can be matched in the cloud side in advance to obtain a mapping table of the high definition map and standard definition map, the correspondence between each road section in the high definition map and each road section in the standard definition map can be included in the mapping table.

After obtaining the planned route based on the standard definition map, the vehicle side can query the mapping table described above through the cloud side to determine the part of the current standard definition map planned route that contains the high definition map, and then for the part containing the high definition map, associate according to the mapping table and high definition map, to determine a driving route in the high definition map, and follow the driving route in the high definition map for automatic driving.

In a possible implementation of automatic driving on the vehicle side, the vehicle side can turn on the Auto Navigation Pilot (ANP) function. For example, referring to FIG. 2, the vehicle side can carry out automatic driving route planning and determine the route calculation result, etc., based on the driving route in the high definition map, and then assist, based on the relevant information in the high definition map, the vehicle to realize automatic driving, such as providing the vehicle with lane changing reminder, lane changing guide line, etc.

When the automatic driving is carried out on the vehicle side, in addition to the auto navigation pilot described above, if condition permits, for example, the automatic driving can be completely performed by the vehicle side, where the specific implementation of the automatic driving can be selected according to the actual needs, this embodiment does not limit it.

It should be understood that as long as the driving route in the high definition map is determined, any possible automatic driving-related functions can be realized. Therefore, it is particularly important to determine the corresponding matched route in the high definition map based on the planned route in the standard definition map.

Based on the above introduction, it can be determined that the current map matching between two maps is based on the corresponding relationship determined by the mapping table between the two maps. However, due to the different mapping specifications and precision requirements of the standard definition map and the high definition map, the road network structure and the road topological connection relationship between the standard definition map and the high definition map are not exactly the same.

Figure 3:
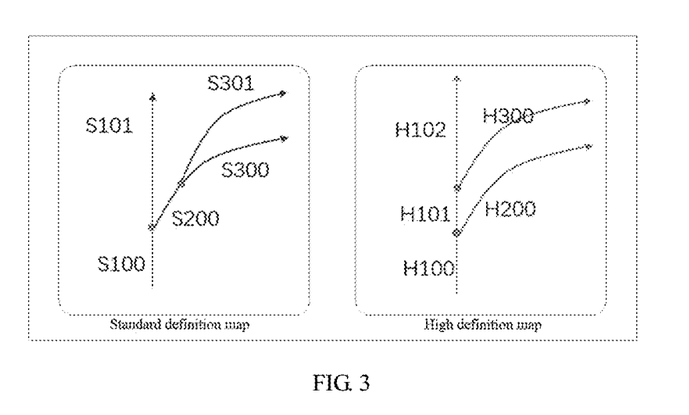
FIG. 3 is a schematic diagram of a road section in a standard definition map and a road section in a high definition map provided by an embodiment of the present disclosure.

For example, it can be understood in combination with FIG. 3, FIG. 3 is a schematic diagram of road sections in a standard definition map and a high definition map provided by an embodiment of the present disclosure.

As illustrated in FIG. 3, FIG. 3 shows the different implementations of several road sections in the same area in the standard definition map and the high definition map.

Referring to FIG. 3, in the high definition map, road section H200 and road section H300 are independently mounted on road section HD100 and road section HD101, respectively. In the standard definition map, road section S300 and road section S301 are connected to road section S200 simultaneously. Although several road sections in the two maps shown in FIG. 3 indicate road sections in the same area in the actual scene, due to the difference in collection accuracy, the road network structure and the road topological connection relationship between the standard definition map and the high definition map are not exactly the same.

As illustrated from FIG. 3, there exists a unique mapping relationship between the standard definition map and the high definition map in some road sections, but there also exist one-to-many, many-to-one or even many-to-many mapping relationship between the standard definition map and the high definition map in some road sections.

For example, there is a one-to-one correspondence between road section S100 and road section H100 in FIG. 3, and a one-to-one correspondence between road section S301 and road section H300. In addition, the correspondence relationship of the remaining road sections is not clear, for example, S200 corresponds to both H101 and H200.

In the current related technology, for road sections with unclear correspondence, one road section is usually selected randomly among multiple corresponding road sections for the automatic driving. For example, S200 corresponds to both H101 and H200, when determining the road section corresponds to S200 in the high definition map, one road section will be randomly selected between H101 and H200.

However, the random selection method may lead to the wrong driving route. For example, the current route H101 is randomly selected, but the user actually needs the vehicle to drive on the road section H200. Therefore, when the current related technology realizes the automatic driving based on the high definition map, there is a problem that the accuracy of the driving path is not high.

In view of the problem in the current related technology, the present disclosure proposes the following technical idea: when the planned route in the standard definition map is matched with the high definition map, the matched road section in the high definition map is determined merely for the road section with a unique mapping relationship. For fuzzy road section with unclear mapping relationships, fill in the road section according to the road section with a unique mapping relationship and the high definition map, to obtain the final matched road section, which can effectively improve the route accuracy of the automatic driving.

The route processing method provided by the present disclosure will be introduced below in combination with specific embodiments. It is worth noting that the execution body of each embodiment of the present disclosure may be the cloud side introduced above, or may also be the vehicle side introduced above. The embodiment does not impose a restriction on this, that is to say, the route matching between the two maps is performed by the vehicle side.

Figure 4:
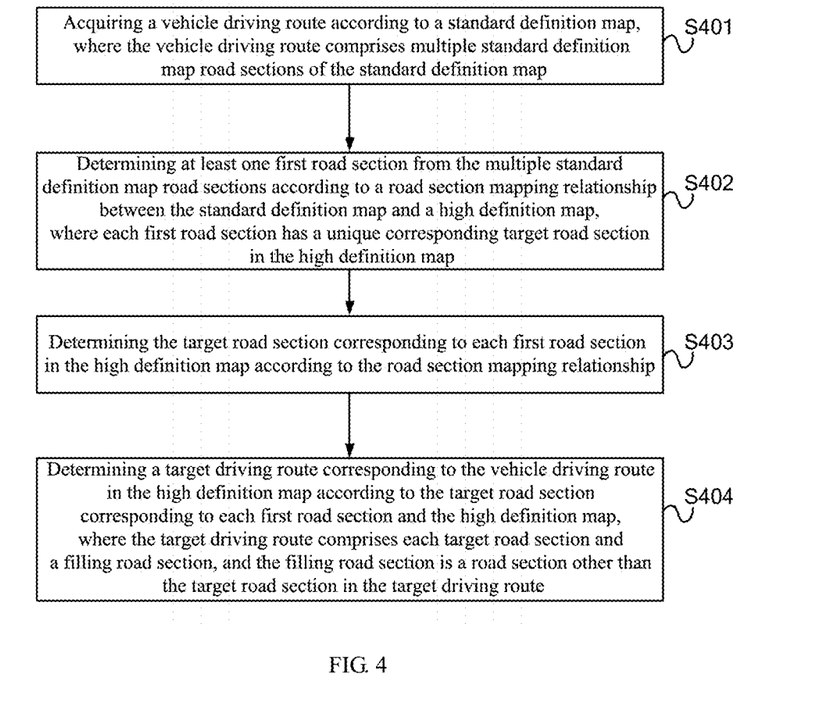
FIG. 4 is a flowchart of a route processing method provided by an embodiment of the present disclosure.

FIG. 4 is a flowchart of a route processing method provided by an embodiment of the present disclosure.

As illustrated in FIG. 4, the method includes:

S401, acquiring a vehicle driving route according to a standard definition map, where the vehicle driving route comprises multiple standard definition map road sections of the standard definition map.

In this embodiment, the vehicle driving route can first be obtained based on a standard definition map. For example, a route can be planned in a standard definition map based on the starting point and ending point to determine the vehicle driving route. The vehicle driving route can include multiple standard definition map road sections, these standard definition map road sections are all road sections in the standard definition map.

S402, determining at least one first road section from the multiple standard definition map road sections according to a road section mapping relationship between the standard definition map and a high definition map, where each first road section has a unique corresponding target road section in the high definition map.

After the vehicle driving route is obtained, a first road section can be determined from the multiple standard definition map road sections of the vehicle driving route according to the road section mapping relationship between the standard definition map and the high definition map stored in the cloud side. The road section mapping relationship includes the mapping relationship between at least one road section in the standard definition map and at least one road section in the high definition map. The specific road section mapping relationship depends on the specific implementation of the standard definition map and the high definition map, which is not limited in this embodiment.

The first road section is a road section that has a unique mapping relationship in the road section mapping relationship, that is, each first road section has a unique corresponding target road section in the high definition map.

It should be understood that determining the first road section among multiple standard definition map road sections is equivalent to first extracting the road section with a unique mapping relationship among the multiple standard definition map road sections.

S403, determining the target road section corresponding to each first road section in the high definition map according to the road section mapping relationship.

Since the first road sections in this embodiment all have their corresponding unique mapping relationship, and the road section mapping relationship includes the mapping relationship between the respective road section in the standard definition map and the respective road section in the high definition map, so after determining the first road section, the target road section corresponding to each first road section in the high definition map can be determined according to the road section mapping relationship stored in the cloud side.

Since the mapping relationship of each first road section is unique, the currently determined target road section corresponding to each first road section can be guaranteed to be correct.

S404, determining a target driving route corresponding to the vehicle driving route in the high definition map according to the target road section corresponding to each first road section and the high definition map, where the target driving route comprises each target road section and a filling road section, and the filling road section is a road section other than the target road section in the target driving route.

After a first road section with a unique mapping relationship is matched, the remaining uncertain road sections can be automatically filled according to the target road section corresponding to each first road section and the high definition map, so as to determine the target driving route corresponding to the vehicle driving route in the high definition map. The target driving route includes the target road section corresponding to each first road section, and also includes the filling road section determined according to the target road section corresponding to each first road section and the high definition map, it should be understood that the filling road section is a road section other than the target road section in the finally determined target driving route.

In a possible implementation, for example, it can be determined whether a unique route can be determined in the high definition map according to target road section respectively corresponding to the first road section. If so, the filling road section can be directly determined. If the unique route cannot be determined, for example, the filling road section can be determined based on the real-time planned route of the vehicle. For example, at least one filling road section can be determined by map matching of the track point and the road network.

Therefore, in this embodiment, the target road section corresponding to the first road section can be first determined according to the first road section which determines the unique matching relationship, and then fill the remaining road section according to the target road section whose accuracy can be ensured and the high definition map, so that the target driving route corresponding to the vehicle driving route is accurately and effectively determined in the high definition map.

It is worth noting that the execution body in this embodiment can be the cloud side or the vehicle side, because the road section mapping relationship is stored in the cloud side described above, then when the execution body of this embodiment is the cloud side, the cloud side can directly perform corresponding processing according to the road section mapping relationship stored in the cloud side; when the execution body is the vehicle side, the vehicle side can access the road section mapping relationship in the cloud side to perform corresponding processing, or it can receive the data issued by the network from the cloud side to perform corresponding processing. This embodiment does not limit the specific execution body, which can be selected according to actual needs.

In this embodiment, after obtaining the target driving route, the vehicle side can, for example, perform the automatic driving according to the target driving route in the high definition map, or perform the automatic assistance driving, such as providing some pieces of driving assistance information, etc., which is not limited in this embodiment.

The route processing method provided by the present disclosure includes: acquiring a vehicle driving route according to a standard definition map, where the vehicle driving route comprises multiple standard definition map road sections of the standard definition map, determining at least one first road section from the multiple standard definition map road sections according to a road section mapping relationship between the standard definition map and a high definition map, where each first road section has a unique corresponding target road section in the high definition map, determining the target road section corresponding to each first road section in the high definition map according to the road section mapping relationship, and determining a target driving route corresponding to the vehicle driving route in the high definition map according to the target road section corresponding to each first road section and the high definition map, where the target driving route comprises each target road section and a filling road section, and the filling road section is a road section other than the target road section in the target driving route. By first determining the first road section with a unique matching relationship among multiple standard definition map road sections, and then determining the target road section corresponding to these first road sections with a clear correspondence in the high definition map, and then filling the remaining road sections according to the target road section corresponding to each first road section and the high definition map. Since the matching accuracy of the first road section can be guaranteed, the accuracy of the target driving route determined in the high definition map can be effectively improved.

Figure 5:
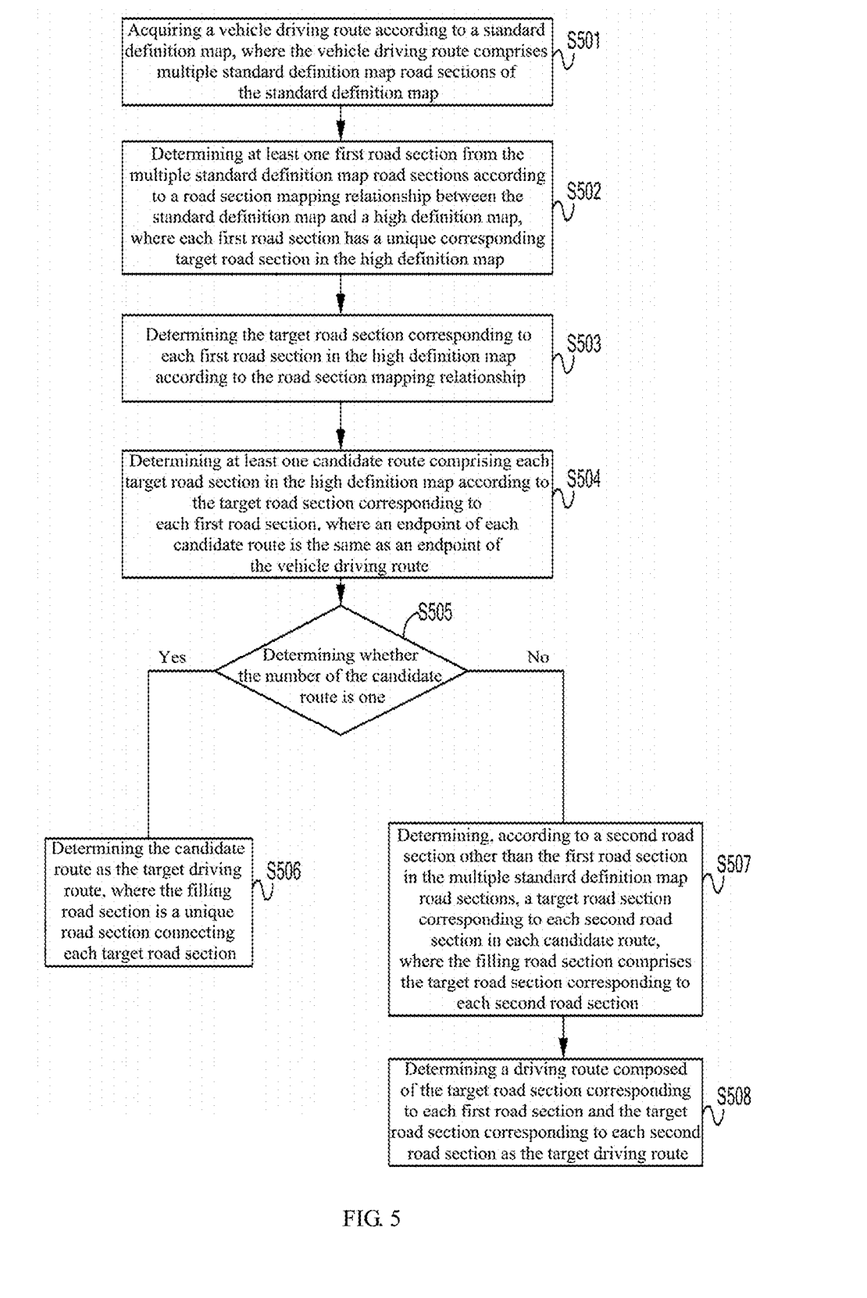
FIG. 5 is a second flowchart of a route processing method provided by an embodiment of the present disclosure.
Figure 6:
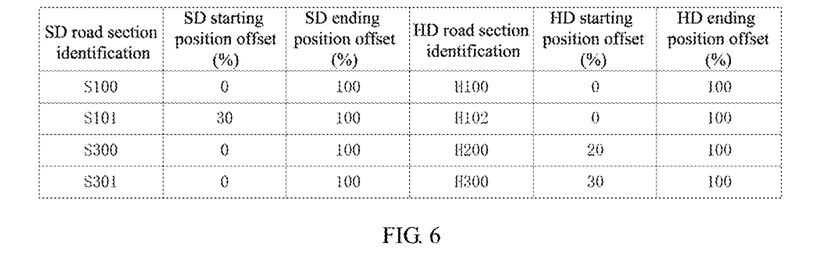
FIG. 6 is a schematic diagram of a possible implementation of the road section mapping relationship provided by an embodiment of the present disclosure.
Figure 7:
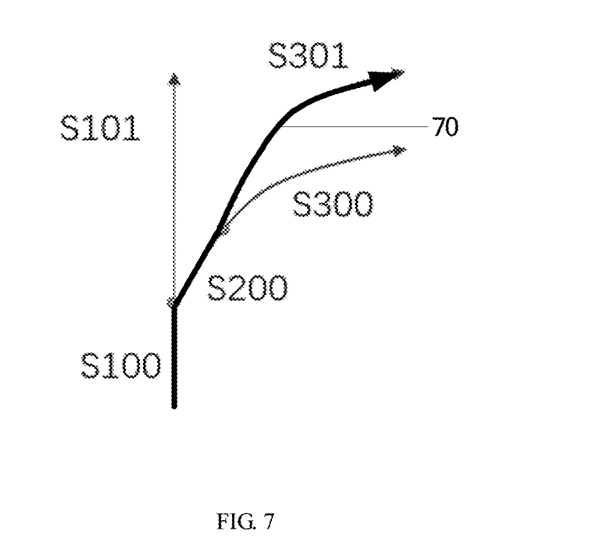
FIG. 7 is a schematic diagram of an implementation of a vehicle driving route provided by an embodiment of the present disclosure.
Figure 8:
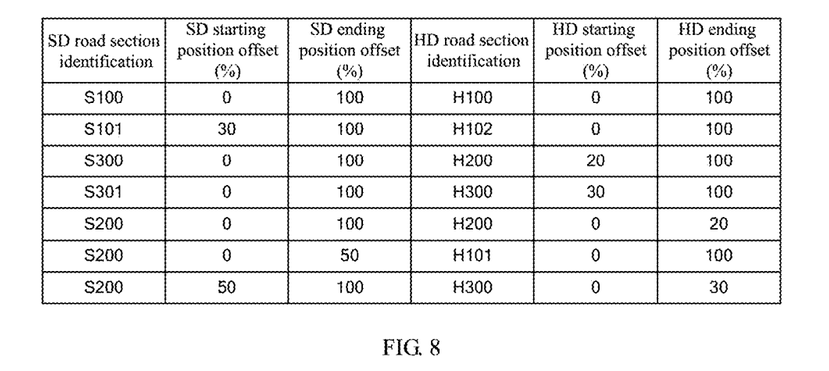
FIG. 8 is a schematic diagram of another possible implementation of the road section mapping relationship provided by an embodiment of the present disclosure.
Figure 9:
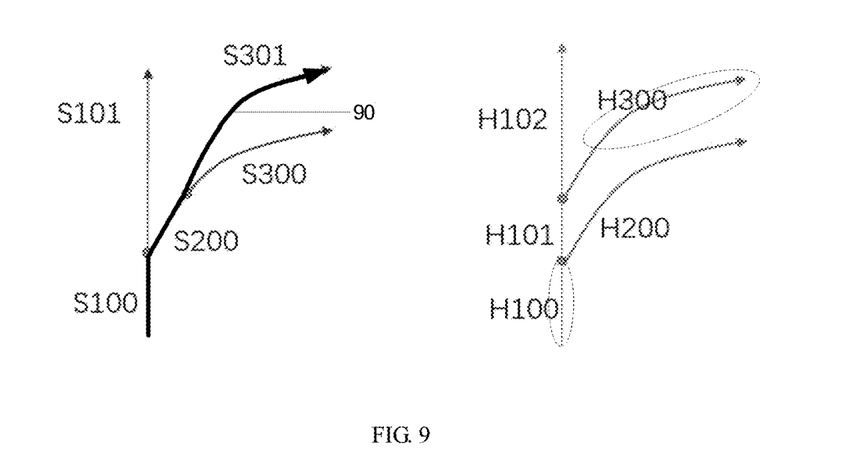
FIG. 9 is a schematic diagram of a possible implementation for determining a target driving route provided by an embodiment of the present disclosure.
Figure 10:
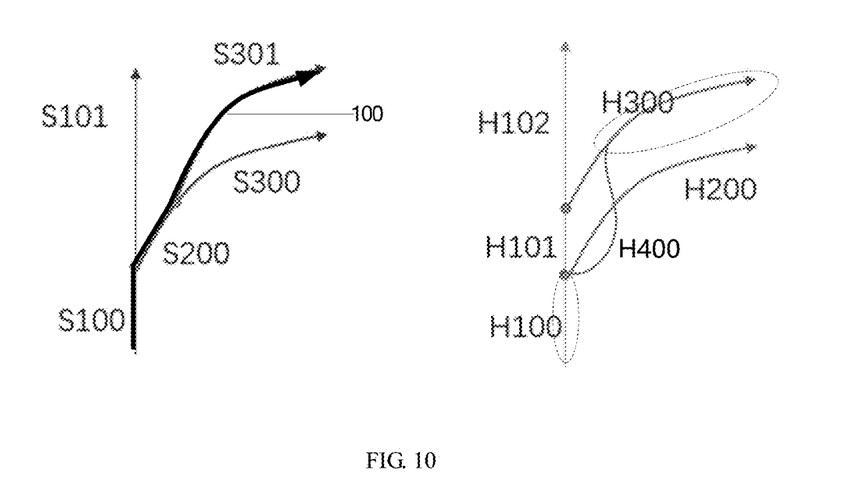
FIG. 10 is another schematic diagram of another possible implementation for determining the target driving route provided by an embodiment of the present disclosure.

On the basis of the foregoing embodiment, the route processing method provided by the embodiment of the present disclosure will be further described in detail below in combination with FIG. 5 to FIG. 10. FIG. 5 is a second flowchart of a route processing method provided by an embodiment of the present disclosure; FIG. 6 is a schematic diagram of a possible implementation of the road section mapping relationship provided by an embodiment of the present disclosure. FIG. 7 is a schematic diagram of an implementation of the driving route of a vehicle provided by an embodiment of the present disclosure. FIG. 8 is a schematic diagram of another possible implementation of the road section mapping relationship provided by an embodiment of the present disclosure. FIG. 9 is a schematic diagram of a possible implementation for determining a target driving route provided by an embodiment of the present disclosure. FIG. 10 is another possible implementation schematic diagram for determining the target driving route provided by an embodiment of the present disclosure.

As illustrated in FIG. 5, the method includes:

S501, acquiring a vehicle driving route according to a standard definition map, where the vehicle driving route comprises multiple standard definition map road sections of the standard definition map.

The implementation of S501 is similar to that of S401, which will not be repeated here.

S502, determining at least one first road section from the multiple standard definition map road sections according to a road section mapping relationship between the standard definition map and a high definition map, where each first road section has a unique corresponding target road section in the high definition map.

The implementation of S502 is similar to that of S402 described above. Here, the implementation of S502 will be further explained in combination with FIG. 6 and FIG. 7.

In this embodiment, the road section mapping relationship may be stored in the cloud side, and the road section mapping relationship may store the mapping relationship between each road section in the standard definition map and each road section in the high definition map, what can be determined based on the above introduction is that there may be a unique mapping relationship between the road section in the standard definition map and the road section in the high definition map, or there may be multiple mapping relationships such as many-to-one, one-to-many, and many-to-many.

In a possible implementation, the road section mapping relationship may include, for example, only the unique road section mapping relationship between the road section in the standard definition map and the road section on the high definition map.

For example, it can be understood in combination with FIG. 6, assuming that the road section schematic relationship between the standard definition map and the high definition map in FIG. 3 is continued to be used.

Based on the road section schematic shown in FIG. 3, it can be determined that only road section S100, road section S101, road section S300, and road section S301 have a unique corresponding road section in the high definition map, and the road section mapping relationship may as illustrated in FIG. 6.

FIG. 6 includes the corresponding relationship between each road section in the standard definition map and each road section in the high definition map. It worth noting that, the unique corresponding relationship described in the present embodiment, is not meant to say that a road section of the standard definition map and a certain road section of the high definition map have a complete one-to-one correspondence. It can be that a certain part of a certain road section in the standard definition map and a certain part of a certain road section in the high definition map are uniquely corresponding, thus the road section mapping relationship can also include the corresponding starting position offset and ending position offset between the road sections.

Specifically, the entire road section of the road section S100 corresponds to the entire road section of the road section H100, the 30%-100% part of the road section S101 corresponds to the entire road section of the road section H102, and the entire section S300 corresponds to the 20%-100% part of the entire section H200, the entire road section of the road section S301 corresponds to the 30%-100% part of the road section H300.

Based on the current implementation of this road section mapping relationship that only includes a unique road section mapping relationship, when determining the first road section among multiple standard definition map road sections, each standard definition map road section can be searched in the road section mapping relationship and the standard definition map road section searched in the road section mapping relationship can be determined as the first road section.

Since the first road section that needs to be currently determined is a standard definition map road section that has a unique corresponding road section in the high definition map, and under the current implementation, the unique mapping relationship between road sections is stored in the road section mapping relationship, thus as long as the standard definition map road section can be searched in the road section mapping relationship, the standard definition map road section can be determined as the first road section.

For example, it can be understood in combination with FIG. 7. For example, the current vehicle driving route determined in the standard definition map is the route indicated by 70 in FIG. 7. It can be seen from FIG. 7 that the vehicle driving route 70 includes three standard definition map road sections which are road section S100, road section S200 and road section S301 respectively.

For example, the road section S100, the road section S200, and the road section S301 can be searched in the road section mapping relationship described in FIG. 6, and it can be determined that the road section S100 and the road section S301 are included in FIG. 6, but the road section S200 is not included. It is determined that the first road section includes road section S100 and road section S301.

The above introduction is the implementation of the road section mapping relationship that only includes the unique mapping relationship between the road sections. In another possible implementation, the road section mapping relationship can also include the mapping relationship of all the road sections between the road section of the standard definition map and the road section of the high definition map, that is, not only can include the unique mapping relationship, but also can include the one-to-many, many-to-one, and many-to-many mapping relationships.

For example, it can be understood in combination with FIG. 8. Assuming that the road section schematic relationship between the standard definition map and the high definition map in FIG. 3 is continued to be used, the road section mapping relationship may as illustrated in FIG. 8.

FIG. 8 includes all the correspondences between each road section in the standard definition map and each road section in the high definition map. Similarly, the road section mapping relationship can also include the corresponding starting position offset and ending position offset between the road sections.

Specifically, the entire road section of the road section S100 correspond to the entire road section of the road section H100; the 30%-100% part of the road section S101 corresponds to the entire road section of the road section H102; the entire road section of the road section S300 corresponds to the 20%-100% part of the road section H200; the entire section of the road section S301 corresponds to the 30%-100% part of the road section H300; the entire section of the road section S200 corresponds to the 0%-20% part of the road section H200; the 0%-50% part of the road section S200 corresponds to the entire section of the road section H101; the 50%-100% part of road section S200 corresponds to the 0%-30% part of the road section H300.

Based on the current implementation of the road section mapping relationship including all mapping relationships of road section, when determining the first road section in the multiple standard definition map road sections, a road section having a unique mapping relationship with the standard definition map road section can be searched from the road section of the mapping relationship, the road section with a unique mapping relationship is determined as the first road section.

Since the first road section that needs to be determined currently is a standard definition map road section that has a unique corresponding road section in the high definition map, and under the current implementation, the correspondences among all road sections are stored in the road section mapping relationship. Therefore, it is necessary to search a road section in the standard definition map with a unique corresponding relationship in the road section mapping relationship, so as to determine the first road section.

Similarly, it can be understood in combination with FIG. 7 above. For example, the current vehicle driving route determined in the standard definition map is the route indicated by 70 in FIG. 7. It can be seen from FIG. 7 that the vehicle driving route 70 includes three standard definition map road sections which are road section S100, road section S200 and road section S301 respectively.

Then, for example, it can be determined whether there is a unique road section correspondence in road section S100, road section S200, and road section S301 in the road section mapping relationship described in FIG. 8. It can be determined from the foregoing FIG. 8, there exists a unique road section correspondence in road section S100 and road section S301, but there are three different road section correspondences for road section S200, so it can be determined that the first road section includes road section S100 and road section S301.

In the actual implementation process, whether the road section mapping relationship specifically includes merely the unique corresponding relationship between the road sections, or includes all the corresponding relationships between the road sections can be selected according to actual needs, and the specific implementation of the road section mapping relationship thereof can also be selected according to actual needs, this embodiment does not make special restrictions on this.

In this embodiment, by setting the road section mapping relationship which can merely include the unique correspondence relationship between the road sections, or include all the correspondence relationships between the road sections, the processing flexibility in the route determining process can be effectively improved. Specific implementation can be selected according to actual needs.

S503, determining the target road section corresponding to each first road section in the high definition map according to the road section mapping relationship.

After determining each first road section, the target road section corresponding to each first road section can be determined according to the road section mapping relationship. The target road section is the road section in the high definition map.

S504, determining at least one candidate route comprising each target road section in the high definition map according to the target road section corresponding to each first road section, where an endpoint of each candidate route is the same as an endpoint of the vehicle driving route.

In this embodiment, the determining a target driving route corresponding to the vehicle driving route in the high definition map according to the target road section corresponding to each first road section and the high definition map may be first determining at least one candidate route comprising each target road section in the high definition map according to the target road section corresponding to each first road section.

It should be understood that since the target road section corresponding to each first road section is a road section whose accuracy can be ensured, at least one candidate route including each target road section can be determined in the high precision map.

In one possible implementation, for example, at least one filling road section that can connect each target road section can be determined according to the topological connection relationship between each target road section, and each target road section and the filling road section are included in the candidate route. An implementation of a filling road section corresponds to a candidate route. For example, the currently determined filling road sections are 1, 2, 3, which correspond to a candidate route; for another example, the currently determined filling road sections are 2, 3, 4, which correspond to another candidate route.

Meanwhile, the endpoints (starting point and ending point) of the candidate route in the high definition map in this embodiment are the same as the endpoints (starting point and ending point) of the vehicle driving route in the standard definition map, which can effectively ensure that the target driving route finally determined based on the candidate route matches the vehicle driving route.

In a possible implementation, for example, according to the first coordinate positions of the starting point and the ending point of the vehicle driving route, the second coordinate positions in the high definition map corresponding to the first coordinate positions can be found in the high definition map, so that the starting point and the ending point in the high definition map can be determined according to the second coordinate positions, and at least one candidate route including each target road section can be determined within the range of the starting point and the ending point in the high definition map.

S505, determining whether the number of the candidate route is one, if yes, executing S506, if not, executing S507.

In this embodiment, it is possible that there is only one topological connection relationship between each target road section, so there is only one implementation of the correspondingly determined filling road section, and the number of the determined candidate routes is also only one.

Alternatively, it is also possible that there may be multiple topological connections between the target road sections, and there may be multiple implementations of the correspondingly determined filling road sections, and the number of the determined candidate routes may be more than one.

As for the different number of candidate routes, there are different implementations when determining the target driving route. Therefore, in this embodiment, it can be judged whether the number of candidate route is one, or it can be judged whether the number of candidate routes is greater than one, the specific judgment method can be selected according to actual needs, as long as the number of current candidate routes can be determined.

S506, determining the candidate route as the target driving route, where the filling road section is a unique road section connecting each target road section.

In a possible implementation, if the number of the candidate route is determined to be only one, it means that there is only one topological connection relationship between the current target routes, so the way to determine the filling road section between the current target routes is unique, therefore, the candidate route can be directly determined as the target driving route. In the current implementation, the filling road section is the only road section connecting each target road section.

For example, it can be understood in combination with FIG. 9. Assuming that the vehicle driving route currently determined in the standard definition map is the route indicated by 90 in FIG. 9, the vehicle driving route 90 includes road section S100, road section S200, and road section S301. Based on the above introduction, it can be determined that the road section S100 and road section S301 are the first road sections.

The target road section corresponding to the first road section S100 in the high definition map is H100, and the target road section corresponding to the first road section S301 in the high definition map is H300, so the target driving route can be currently determined based on the topological connection relationship of H100 and H300 in the high definition map.

It can be seen from FIG. 9, in the topological connection between H100 and H300 in the high definition map, only road section H101 can realize the connection between them. Therefore, road section H101 can be determined as the only filling road section, so as to determine the target driving route in the high definition the map, and the target driving route includes road sections H100, H101 and H300.

Therefore, in this embodiment, the target road section corresponding to the first road section with a unique mapping relationship is first determined, and then according to the topological connection relationship of each target road section, the filling road section that can connect each target road section is determined, when there is only one way to implement the filling road section, so that the target driving section can be accurately and effectively determined.

S507, determining, according to a second road section other than the first road section in the multiple standard definition map road sections, a target road section corresponding to each second road section in each candidate route, where the filling road section comprises the target road section corresponding to each second road section.

In another possible implementation, if the number of the candidate routes is determined to be multiple, it means that there are multiple topological connections between the current target routes. Therefore, the way to determine the filling road section in between is not unique, so further determination of the filling road section is needed.

In this embodiment, a first road section with a unique mapping relationship is determined among multiple standard definition map road sections, and the road section other than the first road section in the standard definition map road sections is determined as the second road section. It should be understood that each second road section is a road section with an unclear correspondence relationship. In this embodiment, multiple candidate routes are determined. The multiple candidate routes can include the target road section corresponding to each second road section. Therefore, the target road section corresponding to each second road section in each candidate route can be determined.

In a possible implementation, map matching can be performed on each candidate route according to the track points of each second road section, so as to determine the target road section corresponding to each second road section.

When performing the map matching, for example, the map matching can be achieved based on the distance and angle between the track points and the road sections For ease of description, the following takes any second road section as an example for introduction, and the implementation of map matching for each second road section is similar.

For any second road section, the distance and angle between each track point and each road section to be matched in the candidate route can be determined according to the position and direction of each track point included in the second road section.

The road section to be matched is the road section in the candidate route excluding each target road section. It should be understood that since the target road section has been determined to be the road section corresponding to each first road section, it can no longer correspond to the second road section. Therefore, there is no need to perform map matching for each target road section, only the map matching of the road sections other than the target road section need to be performed, which can effectively reduce the amount of data that needs to be processed.

After that, in each road section to be matched in the candidate route, at least one matched road section that matches the second road section can be determined according to the distance and angle between each track point and each road section to be matched.

For example, the distance and angle between the track point and the road section to be matched can be input into a preset function, so as to obtain the probability of each track point matching the corresponding road section to be matched, and then the matched road section corresponding to the second road section is determined according to the matching probability corresponding to each track point. For a more specific implementation, please refer to any implementation of map matching in the related art, which will not be repeated here.

After obtaining the matched road section that matches the second road section, the matched road section that matches the second road section may be determined as the target road section corresponding to the second road section in the high definition map.

For example, it can be understood in combination with FIG. 10, assuming that the current vehicle driving route determined in the standard definition map is the route indicated by 100 in FIG. 10, and the vehicle driving route 100 includes road section S100, road section S200, and road section S301. Based on the above introduction, it can be determined that the road section S100 and road section S301 are the first road sections, and S200 of the road section can be the second road section.

The target road section corresponding to the first road section S100 in the high definition map is H100, and the target road section corresponding to the first road section S301 in the high definition map is H300, so the target driving route can be determined based on the topological connection relationship of H100 and H300 in the high definition map currently.

As illustrated from FIG. 10, referring to the topological connection relationship between H100 and H300 in the high definition map, both road sections H101 and H400 can realize the connection in between. Therefore, two candidate routes can be determined, namely a candidate route composed of road sections H100, H101 and H300, and a candidate route composed of road section H100, road section H400 and road section H300.

Then, based on the track points of the second road section S200, the map matching can be performed on the road section to be matched in the candidate route. In the candidate route composed of road section H100, road section H101, and road section H300, road section H101 is the road section to be matched. In the candidate route composed of road section H100, road section H400 and road section H300, road section H400 is the road section to be matched, and the two road sections to be matched can be matched according to the track points of road section S200.

As illustrated from the figure, the road section with closer distance and angle to the track points of S200 is road section H101, so the matched road section that matches road section S200 is H101, and then H101 can be determined as the target road section corresponding to road section S200

S508, determining a driving route composed of the target road section corresponding to each first road section and the target road section corresponding to each second road section as the target driving route.

After determining the target road section corresponding to each second road section, the target road section corresponding to each standard definition map road section included in the vehicle driving route is obtained. Therefore, a driving route composed of a target road section corresponding to each first road section and a target road section corresponding to each second road section can be determined as the target driving route.

For example, in the example of FIG. 10 above, the driving route composed of the target road sections H100 and H300 corresponding to the first road sections and the target road section H101 corresponding to the second road section is the target driving route in the high definition map.

The route processing method provided by the embodiments of the present disclosure provides different setting methods for the road section mapping relationship, for example, it may merely include the unique mapping relationship, or it may also include all the road section mapping relationships, thereby improving the flexibility of route processing. And determining the candidate route according to the topological connection relationship between the corresponding target road sections of each first road section, when there is only one candidate route, the candidate route can be accurately and efficiently determined as the target driving route, and while there are multiple candidate routes, the target road section corresponding to the each second road section can be accurately determined through the map matching, and then the target driving route in the high definition map can be obtained, which can effectively improve the accuracy of determining the driving route in the high definition map.

Figure 11:
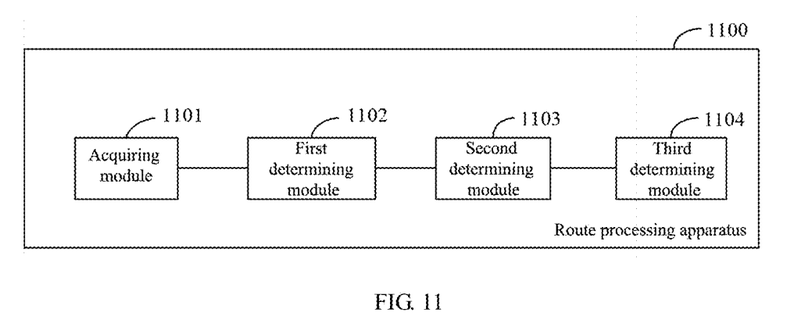
FIG. 11 is a schematic structural diagram of a route processing apparatus according to an embodiment of the present disclosure.

FIG. 11 is a schematic structural diagram of a route processing apparatus according to an embodiment of the present disclosure. As illustrated in FIG. 11, the route processing apparatus according to an embodiment of this embodiment 1100 may include: an acquiring module 1101, a first determining module 1102, a second determining module 1103, a third determining module 1104.

The acquiring module 1101 is configured to acquire a vehicle driving route according to a standard definition map, where the vehicle driving route comprises multiple standard definition map road sections of the standard definition map;

The first determining module 1102 is configured to determine at least one first road section from the multiple standard definition map road sections according to a road section mapping relationship between the standard definition map and a high definition map, where each first road section has a unique corresponding target road section in the high definition map;

a second determining module 1103 is configured to determine the target road section corresponding to each first road section in the high definition map according to the road section mapping relationship;

a third determining module 1104 is configured to determine a target driving route corresponding to the vehicle driving route in the high definition map according to the target road section corresponding to each first road section and the high definition map, where the target driving route comprises each target road section and a filling road section, and the filling road section is a road section other than the target road section in the target driving route.

In one possible implementation, the third determining module 1104 includes:

a first processing unit, configured to determine at least one candidate route comprising each target road section in the high definition map according to the target road section corresponding to each first road section, where an endpoint of each candidate route is the same as an endpoint of the vehicle driving route;

a second processing unit, configured to determine the target driving route corresponding to the vehicle driving route in the high definition map according to a number of the candidate route.

In one possible implementation, the second processing unit is specifically configured to:

determine the candidate route as the target driving route when the number of the candidate route is one, where the filling road section is a unique road section connecting each target road section.

In one possible implementation, the second processing unit is specifically configured to:

determine, according to a second road section other than the first road section in the multiple standard definition map road sections, a target road section corresponding to each second road section in each candidate route when the number of the candidate route is more than one, where the filling road section comprises the target road section corresponding to each second road section;

determine a driving route composed of the target road section corresponding to each first road section and the target road section corresponding to each second road section as the target driving route.

In one possible implementation, the second processing unit is specifically configured to:

for any of the second road sections, determine, according to a position and a direction of each track point comprised in the second road section, a distance and an angle between each track point and each road section to be matched in the candidate route, where the road section to be matched is a road section excluding each target road section in the candidate route;

determine, according to the distance and angle between each track point and each road section to be matched, a matched road section which matches the second road section;

determine the matched road section which matches the second road section as a target road section corresponding to the second road section in the high definition map.

In one possible implementation, the road section mapping relationship comprises a unique road section mapping relationship between a road section of the standard definition map and a road section of the high definition map;

the first determining module 1102 is specifically configured to:

search for each standard definition map road section in the road section mapping relationship, and determine the standard definition map road section searched in the road section mapping relationship as the first road section.

In one possible implementation, the road section mapping relationship comprises all road section mapping relationships between a road section of the standard definition map and a road section of the high definition map;

the first determining module 1102 is specifically configured to:

search for, among the road section mapping relationships, a road section having a unique mapping relationship with the standard definition map road section, and determine the road section having the unique mapping relationship as the first road section.

The present disclosure provides a route processing method and apparatus, which are applied in the field of automatic driving in computer technology to achieve the purpose of improving the accuracy of the matched route in the high definition map.

According to an embodiment of the present disclosure, the present disclosure also provides an electronic device and a readable storage medium.

According to an embodiment of the present disclosure, the present disclosure also provides a computer program product, which includes: a computer program, the computer program is stored in a readable storage medium, at least one processor of the electrical device can read the computer program stored from the computer-readable storage medium, the computer program is executed by the at least one processor to enable the electrical device to execute the solution provided by any of the above embodiments.

Figure 12:
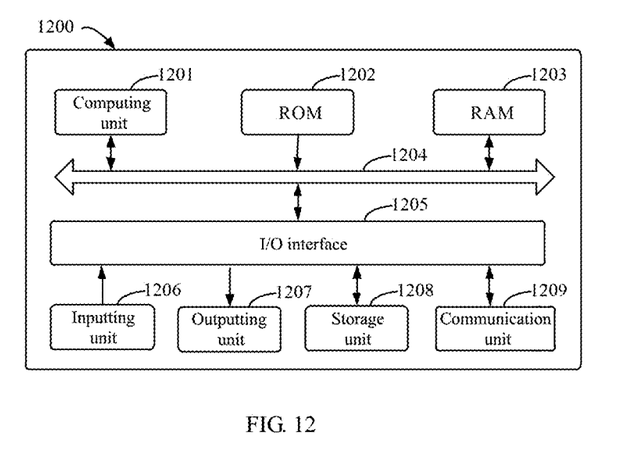
FIG. 12 is a block diagram of an electronic device used to implement the route processing method of an embodiment of the present disclosure.

FIG. 12 shows a schematic block diagram of an exemplary electronic device 1200 that can be used to implement an embodiment of the present disclosure. Electronic devices are intended to represent various forms of digital computers, such as laptop computers, desktop computers, workstations, personal digital assistants, servers, blade servers, mainframe computers, and other suitable computers. Electronic devices can also represent various forms of mobile devices, such as personal digital processing, cellular phones, smart phones, wearable devices, and other similar computing devices. The components shown herein, their connections and relationships, and their functions are merely examples, and are not intended to limit the implementation of the present disclosure described and/or required herein.

As shown in FIG. 12, the electronic device 1200 includes a computing unit 1201, which can be based on a computer program stored in a read only memory (ROM) 1202 or loaded from a storage unit 1208 to a random access memory (RAM) 1203 to perform various appropriate actions and processing. In the RAM 1203, various programs and data required for the operation of the device 1200 can also be stored. The computing unit 1201, the ROM 1202, and the RAM 1203 are connected to each other through a bus 1204. The input/output (I/O) interface 1205 is also connected to the bus 1204.

Multiple components in the device 1200 are connected to the I/O interface 1205, including: an inputting unit 1206, such as a keyboard, a mouse, etc.; an outputting unit 1207, such as various types of displays, speakers, etc.; and a storage unit 1208, such as a disk, optical disc, etc.; and communication unit 1209, such as network card, modem, wireless communication transceiver, etc. The communication unit 1209 allows the device 1200 to exchange information/data with other devices through a computer network such as the Internet and/or various telecommunication networks.

The computing unit 1201 may be various general-purpose and/or special-purpose processing components with processing and computing capabilities. Some examples of the computing unit 1201 include, but are not limited to, a central processing unit (CPU), a graphics processing unit (GPU), various dedicated artificial intelligence (AI) computing chips, various computing units that run machine learning model algorithms, and digital signal processing (DSP), and any appropriate processor, controller, micro-controller, etc. The calculation unit 1201 executes the various methods and processes described above, for example, a route processing method. For example, in some embodiments, the route processing method may be implemented as a computer software program, which is tangibly contained in a machine-readable medium, such as the storage unit 1208. In some embodiments, part or all of the computer program may be loaded and/or installed on the device 1200 via the ROM 1202 and/or the communication unit 1209. When the computer program is loaded into the RAM 1203 and executed by the calculation unit 1201, one or more steps of the route processing method described above can be executed. Alternatively, in other embodiments, the computing unit 1201 may be configured to execute the route processing method in any other suitable manner (for example, by means of firmware).

Various implementations of the systems and technologies described above in the present disclosure can be implemented in digital electronic circuit systems, integrated circuit systems, field programmable gate arrays (FPGA), application specific integrated circuits (ASIC), application-specific standard products (ASSP), a system on chip system (SOC), load programmable logic device (CPLD), computer hardware, firmware, software, and/or a combination thereof. These various embodiments may include: being implemented in one or more computer programs, the one or more computer programs may be executed and/or interpreted on a programmable system including at least one programmable processor, the programmable processor can be a dedicated or general-purpose programmable processor that can receive data and instructions from the storage system, at least one input device, and at least one output device, and transmit the data and instructions to the storage system, the at least one input device, and the at least one output device.

The program code used to implement the method of the present disclosure can be written in any combination of one or more programming languages. These program codes can be provided to the processors or controllers of general-purpose computers, special-purpose computers, or other programmable data processing devices, so that the program codes, when executed by the processors or controllers, enable the function/operation specified in the flowcharts and/or block diagrams is implemented. The program code can be executed entirely on the machine, partly executed on the machine, partly executed on the machine and partly executed on the remote machine as an independent software package, or entirely executed on the remote machine or server.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of machine-readable storage medium would include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

In order to provide interaction with the user, the system and technology described here can be implemented on a computer that has: a display device for displaying information to the user (for example, a CRT (cathode ray tube) or LCD (liquid crystal display) monitor); and a keyboard and pointing device (for example, a mouse or a trackball) through which the user can provide input to the computer. Other types of devices can also be used to provide interaction with the user; for example, the feedback provided to the user can be any form of sensory feedback (for example, visual feedback, auditory feedback, or tactile feedback); and can be in any form (including acoustic input, voice input, or tactile input) to receive input from the user.

The systems and technologies described herein can be implemented in a computing system that includes back-end components (for example, as a data server), or a computing system that includes intermediate components (for example, an application server), or a computing system that includes front-end components (For example, a user computer with a graphical user interface or a web browser, through which the user can interact with the implementation of the system and technology described herein), or include such back-end components, intermediate components, or any combination of front-end components in a computing system. The components of the system can be connected to each other through any form or medium of digital data communication (for example, a communication network). Examples of communication networks include: local area network (LAN), wide area network (WAN), and the Internet.

The computer system may include a client and a server. The client and server are generally far away from each other and usually interact through a communication network. The relationship between the client and the server is generated by computer programs that run on the corresponding computers and have a client-server relationship with each other. The server can be a cloud side server, also known as a cloud side computing server or a cloud side host. It is a host product in the cloud side computing service system to solve the existing shortcomings of difficult management and weak business scalability in traditional physical host and VPS service ("Virtual Private Server", or "VPS" for short). The server can also be a server of a distributed system, or a server combined with a block-chain.

It should be understood that the various forms of processes shown above can be used to reorder, add or delete steps. For example, the steps described in the present application can be executed in parallel, sequentially, or in a different order, as long as the desired result of the technical solution disclosed in the present disclosure can be achieved, this is not limited herein.

The above specific implementations do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this disclosure shall be included in the protection scope of this disclosure.

What is claimed is:

1. A route processing method, comprising:
    acquiring a vehicle driving route according to a standard definition map, wherein the vehicle driving route comprises multiple standard definition map road sections of the standard definition map;
    determining at least one first road section from the multiple standard definition map road sections according to a road section mapping relationship between the standard definition map and a high definition map, wherein each first road section has a unique corresponding target road section in the high definition map;
    determining the target road section corresponding to each first road section in the high definition map according to the road section mapping relationship; and
    determining a target driving route corresponding to the vehicle driving route in the high definition map according to the target road section corresponding to each first road section and the high definition map, wherein the target driving route comprises each target road section and a filling road section, and the filling road section is a road section other than the target road section in the target driving route
    wherein the determining the target driving route corresponding to the vehicle driving route in the high definition map according to the target road section corresponding to each first road section and the high definition map comprises:
    determining at least one candidate route comprising each target road section in the high definition map according to the target road section corresponding to each first road section, wherein an endpoint of each candidate route is the same as an endpoint of the vehicle driving route; and
    determining the target driving route corresponding to the vehicle driving route in the high definition map according to a number of the candidate route;
    and wherein the determining the target driving route corresponding to the vehicle driving route in the high definition map according to the number of the candidate route comprises:
    determining, according to a second road section other than the first road section in the multiple standard definition map road sections, a target road section corresponding to each second road section in each candidate route when the number of the candidate route is more than one, wherein the filling road section comprises the target road section corresponding to each second road section; and
    determining a driving route composed of the target road section corresponding to each first road section and the target road section corresponding to each second road section as the target driving route.

2. The method according to claim 1, wherein the determining the target driving route corresponding to the vehicle driving route in the high definition map according to the number of the candidate route further comprises:
    determining the candidate route as the target driving route when the number of the candidate route is one, wherein the filling road section is a unique road section connecting each target road section.

3. The method according to claim 1, wherein the determining, according to the second road section other than the first road section in the multiple standard definition map road sections, the target road section corresponding to each second road section in each candidate route comprises:
    for each second road section, determining, according to positions of track points comprised in the second road section and a direction of the track points, distances and an angle between the track points and a respective road section to be matched in the candidate route, wherein the road section to be matched is a road section excluding each target road section in the candidate route;
    determining, according to the distances and angle between the track points and the respective road section to be matched, a matched road section which matches the second road section;
    determining the matched road section which matches the second road section as a target road section corresponding to the second road section in the high definition map.

4. The method according to claim 1, wherein the road section mapping relationship comprises a unique road section mapping relationship between a road section of the standard definition map and a road section of the high definition map;
    the determining the at least one first road section from the multiple standard definition map road sections according to a road section mapping relationship between the standard definition map and the high definition map comprises:

searching for each standard definition map road section in the road section mapping relationship, and determining the standard definition map road section searched in the road section mapping relationship as the first road section.

5. The method according to claim 1, wherein the road section mapping relationship comprises all road section mapping relationships between a road section of the standard definition map and a road section of the high definition map;
the determining the at least one first road section from the multiple standard definition map road sections according to a road section mapping relationship between the standard definition map and the high definition map comprises:
searching for, among the road section mapping relationships, a road section having a unique mapping relationship with the standard definition map road section, and determining the road section having the unique mapping relationship as the first road section.

6. A route processing apparatus, comprising:
at least one processor; and
a memory connected in communication with the at least one processor; wherein,
the memory stores instructions executable by the at least one processor, and the instructions are executed by the at least one processor to enable the at least one processor to:
acquire a vehicle driving route according to a standard definition map, wherein the vehicle driving route comprises multiple standard definition map road sections of the standard definition map;
determine at least one first road section from the multiple standard definition map road sections according to a road section mapping relationship between the standard definition map and a high definition map, wherein each first road section has a unique corresponding target road section in the high definition map;
determine the target road section corresponding to each first road section in the high definition map according to the road section mapping relationship; and
determine a target driving route corresponding to the vehicle driving route in the high definition map according to the target road section corresponding to each first road section and the high definition map, wherein the target driving route comprises each target road section and a filling road section, and the filling road section is a road section other than the target road section in the target driving route
wherein the at least one processor is further enabled to:
determine at least one candidate route comprising each target road section in the high definition map according to the target road section corresponding to each first road section, wherein an endpoint of each candidate route is the same as an endpoint of the vehicle driving route; and
determine the target driving route corresponding to the vehicle driving route in the high definition map according to a number of the candidate route;
wherein the at least one processor is further enabled to:
determine, according to a second road section other than the first road section in the multiple standard definition map road sections, a target road section corresponding to each second road section in each candidate route when the number of the candidate route is more than one, wherein the filling road section comprises the target road section corresponding to each second road section; and
determine a driving route corn posed of the target road section corresponding to each first road section and the target road section corresponding to each second road section as the target driving route.

7. The apparatus according to claim 6, wherein the at least one processor is further enabled to:
determine the candidate route as the target driving route when the number of the candidate route is one, wherein the filling road section is a unique road section connecting each target road section.

8. The apparatus according to claim 6, wherein the at least one processor is further enabled to:
for each second road sections, determine, according to positions of track points comprised in the second road section and a direction of the track points, distances and an angle between the track points and a respective road section to be matched in the candidate route, wherein the road section to be matched is a road section excluding each target road section in the candidate route;
determine, according to the distances and angle between the track points and the respective road section to be matched, a matched road section which matches the second road section;
determine the matched road section which matches the second road section as a target road section corresponding to the second road section in the high definition map.

9. The apparatus according to claim 6, wherein the road section mapping relationship comprises a unique road section mapping relationship between a road section of the standard definition map and a road section of the high definition map;
wherein the at least one processor is further enabled to:
search for each standard definition map road section in the road section mapping relationship, and determine the standard definition map road section searched in the road section mapping relationship as the first road section.

10. The apparatus according to claim 6, wherein the road section mapping relationship comprises all road section mapping relationships between a road section of the standard definition map and a road section of the high definition map;
wherein the at least one processor is further enabled to:
search for, among the road section mapping relationships, a road section having a unique mapping relationship with the standard definition map road section, and determine the road section having the unique mapping relationship as the first road section.

11. A non-transitory computer-readable storage medium storing computer instructions, wherein the computer instructions are used to enable a computer to:
acquire a vehicle driving route according to a standard definition map, wherein the vehicle driving route comprises multiple standard definition map road sections of the standard definition map;
determine at least one first road section from the multiple standard definition map road sections according to a road section mapping relationship between the standard definition map and a high definition map, wherein each first road section has a unique corresponding target road section in the high definition map;

determine the target road section corresponding to each first road section in the high definition map according to the road section mapping relationship; and determine a target driving route corresponding to the vehicle driving route in the high definition map according to the target road section corresponding to each first road section and the high definition map, wherein the target driving route comprises each target road section and a filling road section, and the filling road section is a road section other than the target road section in the target driving route wherein the computer is further enabled to:

determine at least one candidate route comprising each target road section in the high definition map according to the target road section corresponding to each first road section, wherein an endpoint of each candidate route is the same as an endpoint of the vehicle driving route; and determine the target driving route corresponding to the vehicle driving route in the high definition map according to a number of the candidate route;

wherein the computer is further enabled to:

determine, according to a second road section other than the first road section in the multiple standard definition map road sections, a target road section corresponding to each second road section in each candidate route when the number of the candidate route is more than one, wherein the filling road section comprises the target road section corresponding to each second road section; and determine a driving route composed of the target road section corresponding to each first road section and the target road section corresponding to each second road section as the target driving route.

12. The computer-readable storage medium according to claim 11, wherein the computer is further enabled to:

determine the candidate route as the target driving route when the number of the candidate route is one, wherein the filling road section is a unique road section connecting each target road section.

13. The computer-readable storage medium according to claim 11, wherein the computer is further enabled to:

for each second road sections, determine, according to positions of track points comprised in the second road section and a direction of the track points, distances and an angle between the track points and a respective road section to be matched in the candidate route, wherein the road section to be matched is a road section excluding each target road section in the candidate route;

determine, according to the distances and angle between the track point points and the respective road section to be matched, a matched road section which matches the second road section;

determine the matched road section which matches the second road section as a target road section corresponding to the second road section in the high definition map.

14. The computer-readable storage medium according to claim 11, wherein the road section mapping relationship comprises a unique road section mapping relationship between a road section of the standard definition map and a road section of the high definition map;

wherein the computer is further enabled to:

search for each standard definition map road section in the road section mapping relationship, and determine the standard definition map road section searched in the road section mapping relationship as the first road section.

* * * * *